Dec. 4, 1962
L. Q. HINES, SR
3,066,743
ROTARY TILLING DEVICE
Filed Nov. 27, 1956
3 Sheets-Sheet 3
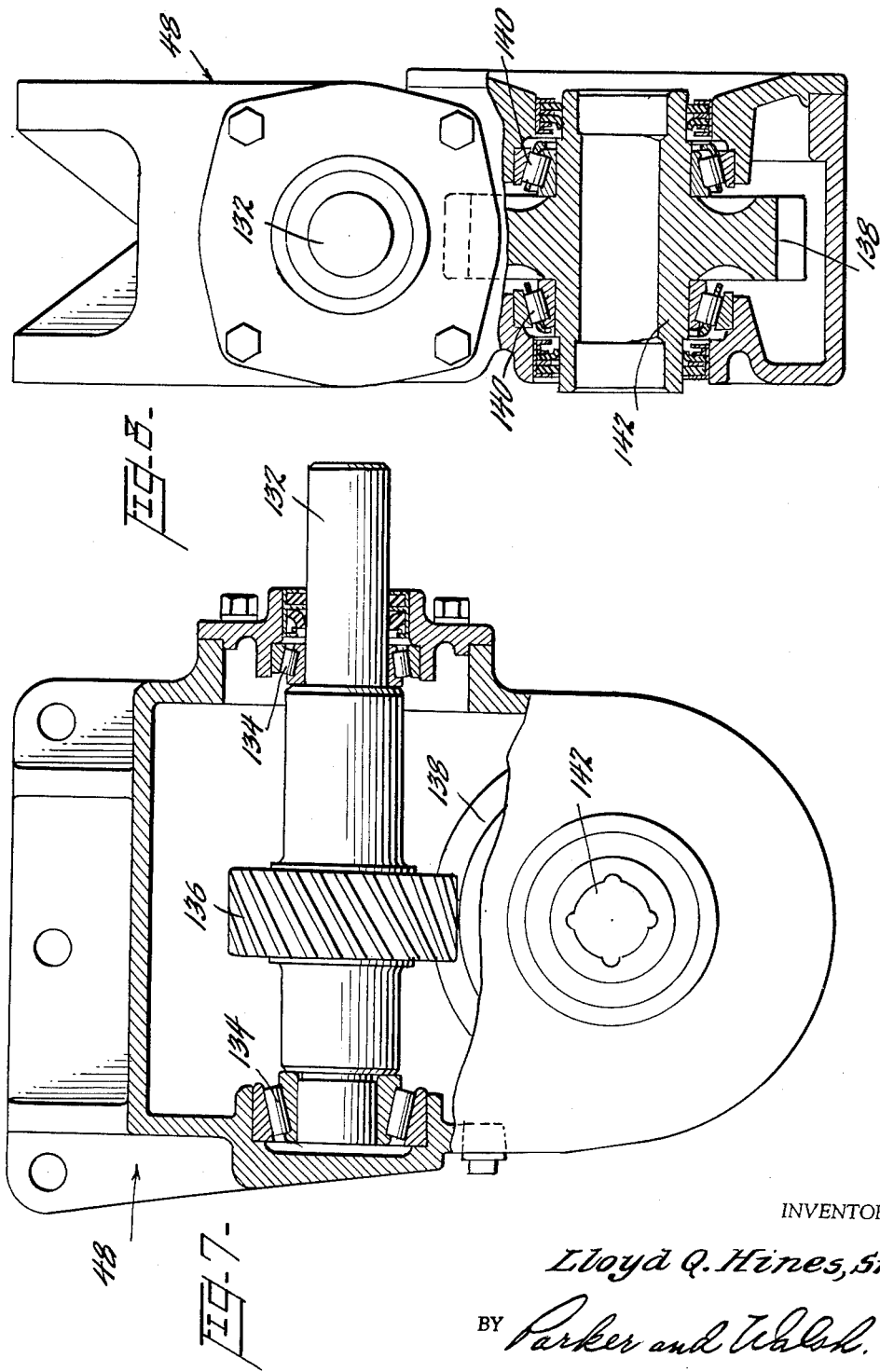
INVENTOR
Lloyd Q. Hines, Sr.,
BY Parker and Walsh.
ATTORNEYS United States Patent Office 3,066,743
Patented Dec. 4, 1962

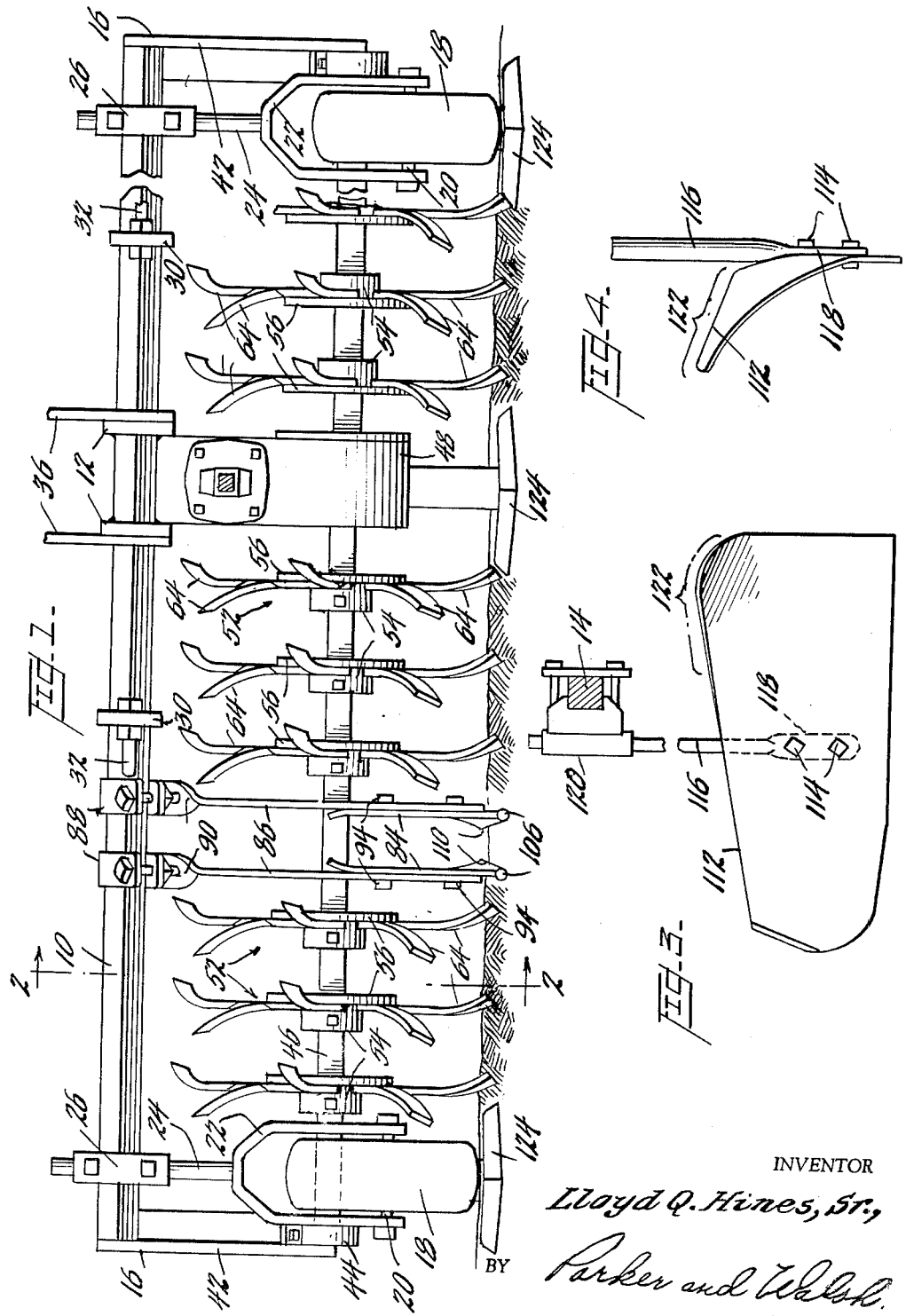

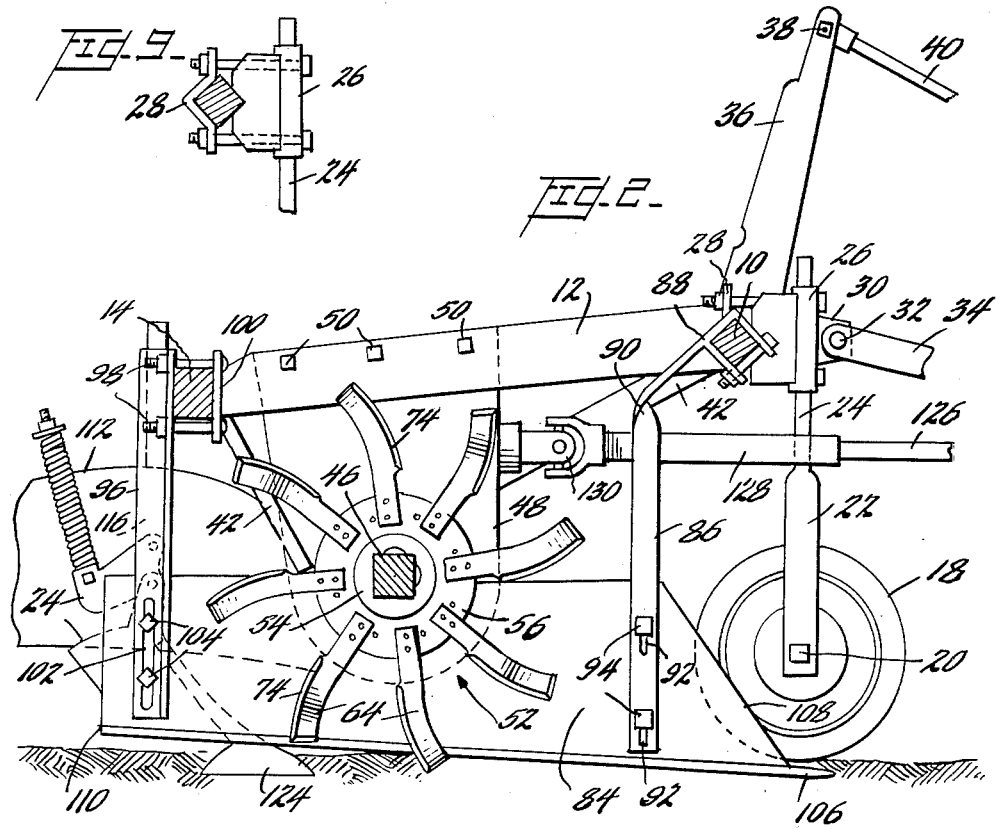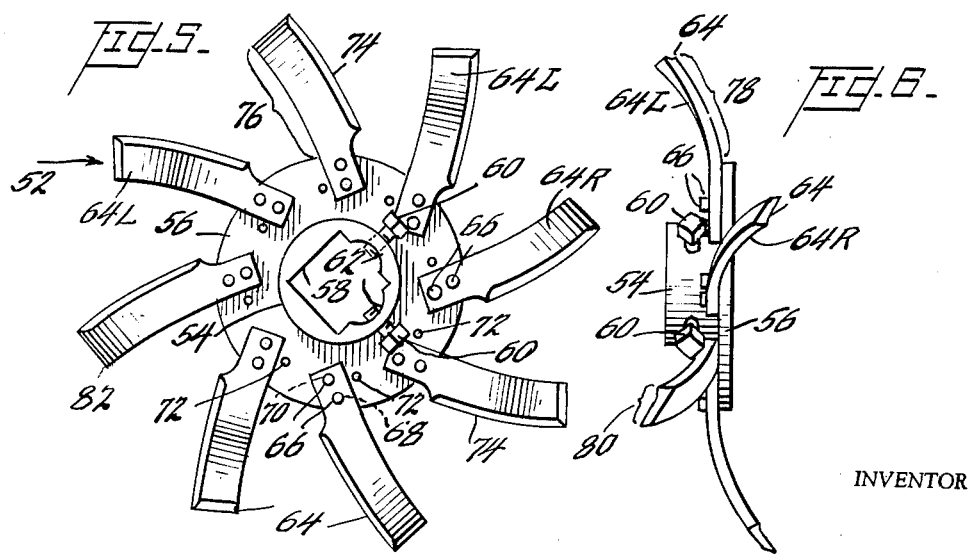

3,066,743
ROTARY TILLING DEVICE
Lloyd Q. Hines, Sr., 411 W. Riverview Drive, Suffolk, Va.
Filed Nov. 27, 1956, Ser. No. 624,631
2 Claims. (Cl. 172—81)

This invention relates to a rotary tilling device.

More particularly, the tilling device of this invention is intended for attachment to the rear of a tractor equipped with a hydraulic system for manipulating the attached implement. Such tractors are in wide use, one well known type being known as Ford-Ferguson System tractors.

My tilling device is intended primarily for the cultivation of growing crops planted in rows. To that end, it is provided with a horizontal shaft adapted to be drawn at right angles to the row of growing crops. Means are provided for rotating the shaft through a connection to the power take-off of the tractor. The shaft carries a plurality of rotary tilling elements each provided with a means for adjustably securing the element to the shaft at any desired point thereon. In this manner, the tilling apparatus may be arranged for tilling a variety of crops, each being planted in rows of varying widths.

Each tilling element is made up of a central hub for mounting upon the driven shaft and provided with a multiplicity of cutting teeth. The hubs are provided with novel means for permitting frequent readjustment of the hubs along the shaft.

The tilling teeth are arranged to diverge outwardly in alternation, the path of divergence, from the point of attachment of the blade to the hub constituting a smooth curve. Also, the blades are curved radially backward from the point of attachment, the path of this curve also being a smooth one.

In order to protect the growing plants from the flying earth particles turned up by the tilling elements, I provide fenders for the plants. One set of fenders is intended to travel close to the ground. The fore portion of the fender may be made to actually travel slightly below the surface of the ground being shaped to pick up any straggling plant runners to bring them within the protection of the fender proper. The rear portion of the fender is intended to travel above the ground level and is lightly turned inwardly to keep the lower portion of the plant supported while the tilling device throws the earth inwardly toward the base of the plant.

A second set of fenders is provided to protect the upper portion of the plant from flying dirt particles and the rear portion of these fenders is curved outwardly in such manner as to interrupt the travel of the individual particles and redirect them so that they tend to fall at the base of the growing plants to form the desired hills. In order to adjust the operation of the device to various types of growing crops, means are provided for adjusting the location of both sets of fenders as required.

Other features of novelty of my invention will appear as the description progresses.

Reference will now be made to the drawings for a fuller understanding of the invention:

FIGURE 1 is a front elevation of the invention with parts broken away to afford greater clarity;

FIGURE 2 is a vertical section taken along the line 2—2 of FIGURE 1;

FIGURE 3 is a side elevation of one of the dirt-diverting fenders forming a part of my invention;

FIGURE 4 is a rear view of the fender shown in FIGURE 3;

FIGURE 5 is an enlarged view of one of the tilling elements of my invention;

FIGURE 6 is a view taken at right angle to FIGURE 5;

FIGURE 7 is an enlarged side view, partly in section, of the gear box employed in my invention;

FIGURE 8 is a front view, also partly in section, of the gear box shown in FIGURE 7; and FIGURE 9 is a detail of FIGURE 1 showing the mounting of one of the wheels upon the frame.

In the drawings, reference numeral 10 refers to a forward diamond bar connected by a pair of frame plates 12 to a rear box bar 14. The two bars are connected at their ends by plates 16. Preferably the plates and bars are secured as a rigid framework by means of welding although it is obvious that other methods of joining may be as easily used. The framework is supported above the ground on a pair of dolly wheels 18.

Each dolly wheel 18 is carried on an axle 20 passing through the ends of fork 22. The closed end of the fork is united to post 24 clamped in bracket 26 about diamond bar 10 by means of bolts and a fitting 28. The bracket 26 receives post 24 adjustably to regulate the height at which the framework is carried above the ground.

Draft plates 30 may be secured to diamond bar 10 as by welding and carry coupling pins 32 bolted thereon. The pins are appropriately spaced apart to receive drawbars 34 according to standard dimensions commonly employed in the agricultural implement industry. The drawbars 34 connect the implement to the rear of a tractor not shown. Extending upwardly from the diamond bar 10 are a pair of arms 36 pivoted at 38 to hydraulic rod 40, connected to the hydraulic lift of the tractor. When the hydraulic lift is actuated, the rear of the implement frame is lifted upwardly to permit clearance of the ground contacting members to be subsequently described, as the implement is turned at the end of a row.

Depending arms 42 extend toward each other from the diamond bar 10 and the box bar 14 to form a support for end bearings 44 carrying the square driven shaft 46. The shaft 46 is also supported in the center of the frame by gear box 48 through which it passes. The gear box 48 is bolted at 50 to the two frame plates 12.

Mounted upon the driven shaft 46 are a plurality of tilling elements 52. Each of the tilling elements is provided with a hub 54 and a hub plate 56, preferably formed integrally as a malleable casting. The hub 54 is provided with an opening 58 through which shaft 46 passes. A pair of set screws 60 in the hub 54 enable the hub to be fixed upon the shaft 46. It is contemplated that the tilling elements will be moved along the length of the shaft from time to time to enable the apparatus to be used for working crops spaced apart in rows of varying widths. After several such adjustments, it is found that the points of set screws 60 will have raised burrs of appreciable size on shaft 46. In order to provide clearance for these burrs, so that the elements 52 may slide freely the length of the shaft 46, channels 62 are provided to enlarge the openings 58.

A plurality of blades 64 is bolted to plate 56 by means of bolts 66 entering a ring of outer holes 68 and an inner ring of holes 70. Depending upon the particular crop being cultivated and the season of cultivation, it may be desirable to change the angle of attack of blades 64 and, to this end, I provide an alternate ring of inner holes 72, so that the angle of attack of blades 64 may be changed.

Each blade is of generally rectangular or knife blade cross-section with a sharp leading edge 74. The blades are arched backwardly with respect to a radius extending outwardly from the center of the hub, along a substantially smooth curve 76. Alternate blades 64L and 64R are curved outwardly to the left and right respectively along another smooth curve 78. Additionally, the blade is twisted as indicated by reference numeral 80 so that the leading edge is in advance of the trailing edge. Finally, at the outer ends, the back portion 82 of the end of the blade is relieved with respect to the point.

Since the tilling elements 52 cause a great deal more agitation of the soil than is the case with many other cultivators, I find it desirable to protect the rows of growing plants with pairs of fenders 84. Each fender has a front support bar 86 provided with a clevis top 88 for securing to the diamond bar 10 by means of a bolt passing through the outer arms of the clevis. The bar 86 is given a half twist at 90 to bring it into substantially vertical array. A pair of slots 92 receive bolts 94 passing through the fender 84.

The fenders are supported at the rear by a pair of angle bars 96 secured by bolts 98 and plate 100 to the box bar 14. Another pair of slots 102 and bolts 104 complete the vertical adjustability of the fenders 84.

Each fender has a slightly elongated point 106 and a front edge 108 rounded and sloping to the rear. This construction adapts the fender to pick up and confine within the space between the two fenders, the outward extending and trailing portions of the plants being cultivated, thereby protecting such portions of the plant against injury. It is preferred to adjust the lowermost point 106 of the fender so that it travels slightly below ground level. The rear lower edge of the fender is turned inwardly at 110 toward the plants so that, when the rear end of the fender is raised slightly above ground level, there will be an opportunity for the earth particles in the center between the rows of plants, to be thrown inwardly toward the base of the plants.

Additional fenders are arranged in pairs for each row as indicated by reference numeral 112. These are secured by bolts 114 to tubular member 116 on the flattened portion 118 thereof. The shank of tubular member 116 is secured to the frame by means of clamping block 120 so that there may be vertical adjustment of the fender. The fender 112 is intended for positioning above fender 84 and more distant from the center line of the crow row. Its purpose is to protect the upper portions of the crops from the impact of flying dirt particles dislodged by tilling elements 52 as well as to return the particles to a position adjacent the roots of the crops. Generally, the fender 112 is of substantially flat configuration but at the upper rear section designated by reference numeral 122 is curved outwardly and downwardly so that as dirt is cast upwardly against this portion of the fender, the curved portion 122 will tend to be struck at right angles by the particles in their multiple paths with the consequence that they will immediately lose all of their kinetic energy and fall substantially straight downwardly. Supplementing the action of both sets of fenders, a cover for the entire framework formed of elements 12, 14 and 16, is provided to prevent upward travel of dirt particles. In order to more effectively show the internal working of my invention, I have not shown this cover on the drawing.

It will be noted that various portions of the tilling device cooperate to break up and cultivate the soil between the rows and to build up the hills about the roots of the growing plants. The fenders 84 move farthest forward to lift up the trailing, spread out runners of the plants, gathering them up and protecting them between the two shields, one on each side of the row. The tilling elements 52 break up and pulverize the soil between the rows and tend to cast it toward the plants. During the forward portion of the movement of the entire apparatus, the fenders 74 limit the travel of the cast dirt but, toward the later portion of the travel of the implement with respect to a single plant, the under portion of the leaves is gently lifted up by the portions 110 of fenders 74, permitting the hills to be built up, close to the stems of the plants, without injury to the leaves thereof. If it is desired to further build up the hills at the expense of the soil between the rows, conventional trip-shank cultivating plows 124 may be carried by the implement to move the earth to both sides toward the plants.

Unlike the majority of tilling devices where the tilling elements are passively pulled through the earth, my invention employs positively driven tilling elements and I contemplate varying the speed of the tilling elements according to the soil conditions encountered. The conventional farm tractor of the kind previously mentioned is provided with a power take-off at the rear thereof, usually a shaft extending outwardly and rearwardly between the two large main wheels of the tractor. It will be assumed that this is the type available for the drive of my implement. A drive shaft including inner 126 and outer 128 interfitting elements and one or more universal joints 130 may be employed. The inner element 126 slides in and out of the element 128 to accommodate lengthwise variation in the hitch while the universal joints permit transfer of power between shafts not lying in the same plane. Through this drive shaft power is transmitted from the tractor to the input shaft 132 of the gear case 48.

I prefer to support the input shaft 132 directly upon bearings 134 mounted within gear case 48. In turn, shaft 132 carries the first of two cross-helix gears 136 and 138 within the gear case. These two gears translate the power from shaft 132 to power shaft 142 at right angles thereto. Shaft 142, supported on bearings 140, has a generally rectangular opening for receiving shaft 46 upon which the tilling elements are mounted. I have found wide face, cross-helix gears especially well suited to the drive of my tilling implement. Their use makes it possible to deliver a steady flow of substantial amounts of power as are required by the nature of the tilling operation carried out.

The depth of tillage may be regulated by adjustment of the wheel post 24 on the diamond bar 10 and by the length of the hydraulic hitch 40. As previously discussed, the angle of attack of the tilling elements may be changed according to soil conditions. The wheels, the tilling elements, as well as the trip shank plows, and both sets of fenders are all longitudinally adjustable upon the frame and are even removable from the frame to permit the adjustment of the various parts to the different row plantings. In addition, the fenders are both horizontally and vertically adjustable according to the size of the growing plants. In this way, the tilling implement is unusually versatile.

The implement is suitable for use in tandem with other appropriate implements such as fertilizer applicators of various types.

The curved blades are effective in dislodging and uprooting weeds growing between the rows being cultivated so that they fall upon the top of the ground whereas the conventional cultivator merely turns such plants under the soil. With the plants on top of the soil and with most of their root structure denuded of earth, they dry out in the sun rapidly and thus are effectively gotten rid of instead of growing up again after having been turned under.

I claim:

1. A tilling device for crops growing in rows, having a frame extending over a plurality of rows, at right angles thereto, transport means for moving said frame along said rows, tilling elements supported on said frame and located to till the soil between the crop rows said elements being characterized in that the elements in their operation break up the soil and cast it backwardly, upwardly and toward the adjacent row of growing plants and a plurality of fenders supported on said frame, each extending longitudinally in the direction of travel between a crop row and an immediately adjacent tilling element, each fender including a broad, flat, vertically extending surface for protecting the cultivated plants from earth particles cast sidewardly by the tilling element, the upper rear quadrant of each fender being curved forwardly and downwardly toward its adjacent tilling element to intercept the flight of earth particles cast to the rear and upwardly, by an adjacent tilling element, to direct said particles downwardly and into the space between the crop rows.

2. A tilling device as defined in claim 1 including a second group of fenders arranged in pairs, one on each side of a crop row, means for supporting said fenders in place on the frame with the fore-part of the lower fender edge at least as low as the ground level and with the trailing edge above ground level, each said fender including a broad, flat vertically and horizontally extending surface for protecting the plants from earth particles cast sidewardly by the tilling elements, a rounded, forwardly-pointed member on the lower fore-part of each fender for engaging outwardly-trailing portions of the growing plants and sweeping them inwardly between a pair of adjacent fenders and an upwardly, inwardly turned portion on the rear lower edge of said fender for tilling the earth beneath the plants.

References Cited in the file of this patent

UNITED STATES PATENTS

| | | |
|---|---|---|
| 205,463 | Austin et al. | July 2, 1878 |
| 310,109 | Witt | Dec. 30, 1884 |
| 646,453 | Naistrom | Apr. 3, 1900 |
| 944,770 | Brigden | Dec. 28, 1909 |
| 977,911 | Watt | Dec. 6, 1910 |
| 1,259,301 | Seitz | Mar. 12, 1918 |
| 1,419,477 | Summerlin | June 13, 1922 |
| 1,475,455 | Skinner et al. | Nov. 27, 1923 |
| 1,528,863 | Walker | Mar. 10, 1925 |
| 1,662,088 | Von Raussendorff | Mar. 13, 1928 |
| 1,779,334 | Reeves | Oct. 21, 1930 |
| 2,012,434 | Pedersen | Aug. 27, 1935 |
| 2,168,733 | Dufour | Aug. 8, 1939 |
| 2,575,321 | Traver | Nov. 13, 1951 |
| 2,662,462 | Hammon | Dec. 15, 1953 |
| 2,679,200 | Johnson et al. | May 25, 1954 |
| 2,689,510 | Petermann | Sept. 21, 1954 |
| 2,694,969 | Chattin | Nov. 23, 1954 |
| 2,830,389 | Simpson | Apr. 15, 1958 |